Aug. 17, 1965     W. PALMER     3,201,792
TIMING SIGNAL SYNCHRONIZING SYSTEM
Filed June 5, 1962     2 Sheets-Sheet 1

INVENTOR.
WINSLOW PALMER
BY Robert J. Haase
ATTORNEY

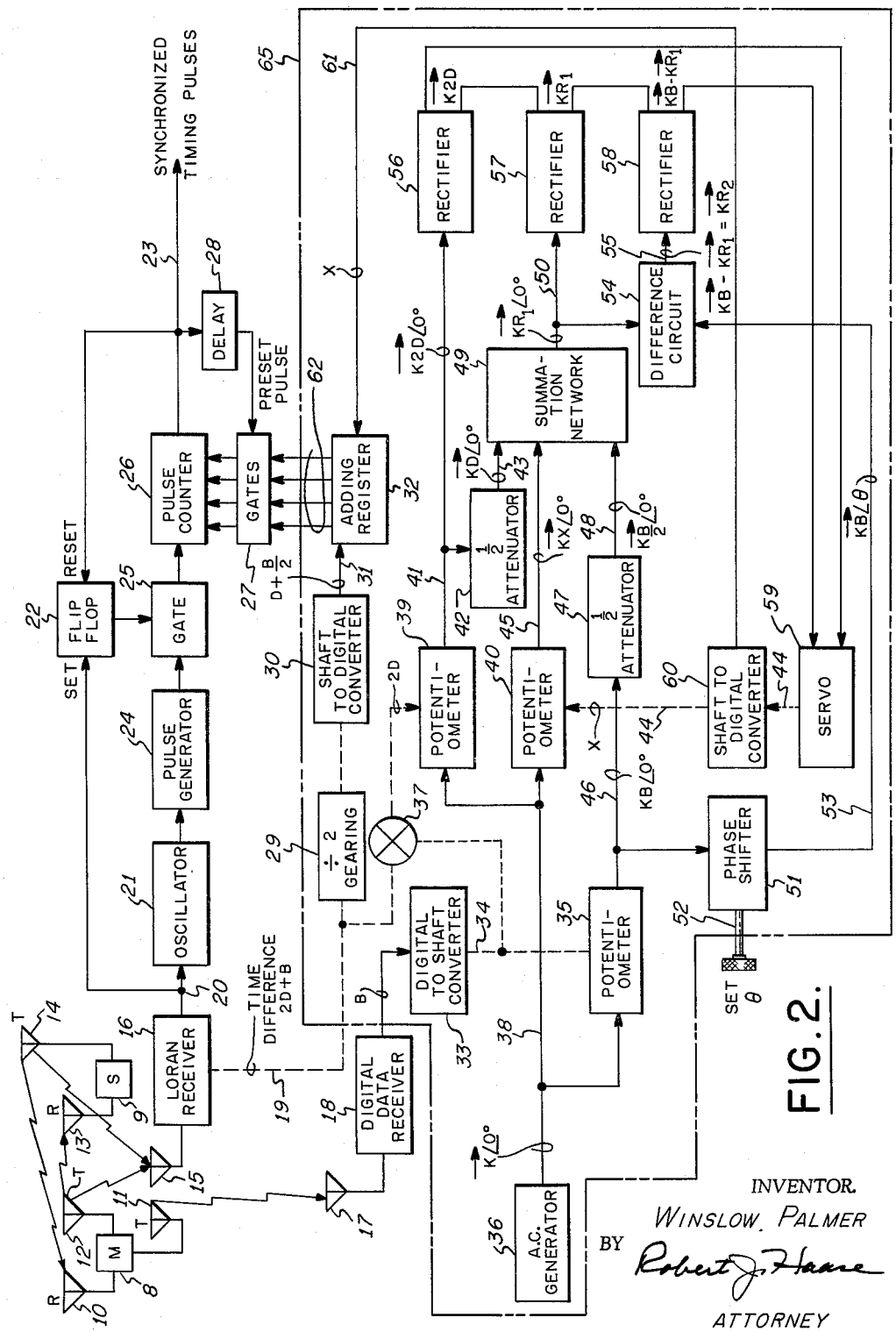

United States Patent Office 3,201,792
Patented Aug. 17, 1965

3,201,792
TIMING SIGNAL SYNCHRONIZING SYSTEM
Winslow Palmer, Amityville, N.Y., assignor to Sperry Rand Corporation, Great Neck, N.Y., a corporation of Delaware
Filed June 5, 1962, Ser. No. 200,279
6 Claims. (Cl. 343—103)

The present invention generally relates to a system for the precise synchronization of widely separated signal sources. More particularly, the invention is concerned with a receiver for producing a locally generated timing signal synchronized to a distant source of timing signal transmissions whereby the synchronization is substantially independent of the propagational delay of the transmissions.

Accurate timing signals have been provided by radio for many years. Recently, however, the accuracy required of such radio facilities has increased to a point where the retardation of the signal in transversing the distance from the transmitter to the receiver contributes a significant part of the tolerable synchronizing error. One solution to the timing problem, of course, lies in measuring the distance between the timing signal transmitter and the receiver and measuring the velocity of signal propagation between the transmitter and receiver at least to the accuracy with which synchronization is to be established. The value of the velocity of propagation, however, is not established simply. Moreover, a fixed value cannot be assumed because said velocity is subject to variation as a function of atmospheric pressure, humidity, temperature, ionization and other propagational parameters.

The principal object of the present invention is to provide receiver means for synchronizing a locally generated timing signal to timing signal transmissions from a distant source substantially independently of the propagational delay of the transmitted timing signal.

Another object is to provide receiver apparatus for providing a locally generated timing signal synchronized to timing signal transmissions from a distant source substantially independently of either the distance between the source and the receiver or the velocity of propagation of the timing signal transmissions.

A further object is to provide a timing signal synchronizing system comprising cooperating transmitters and a receiver generating a timing signal, which timing signal is synchronized to a predetermined one of the transmitted signals independently of variations in the velocity of propagation of the signal issuing from said predetermined transmitter.

Another object is to provide a timing signal synchronizing system comprising two cooperating transmitters and a receiver wherein provision is made for propagational velocity variations between one of the transmitters and the receiver by determining the elapsed time of a signal communicated between the two transmitters.

These and other objects of the present invention, as will appear more fully from a reading of the following specification, are achieved in a preferred embodiment by the provision of a pair of transmitters and a receiver similar to those utilized in conventional loran hyperbolic navigational systems. There is additionally provided at one of the transmitters (master station) a monitoring receiver for measuring the round trip propagational delay of a timing signal issuing from the master transmitter and returned by the slave transmitter to the master transmitter. A data signal representing the measured round trip propagational delay between the two transmitters is transmitted to the receiver. The receiver utilizes the delay data together with the time difference measured at the receiver between the receptions of timing signals from the two transmitters and the geographical bearing of the receiver with respect to the base line between the transmitters to compute the propagational delay between the master station and the receiver. The computed delay, in turn, is used to control the phasing of pulses locally generated within the receiver so that the locally generated pulses bear a predetermined and unchanging phase relationship with respect to the timing signal generated at the master station irrespective of variations in the velocity of signal propagation along the path between the master station and the receiver.

For a more complete understanding of the present invention, reference should be had to the following specification and to the appended figures of which;

FIG. 2 is a simplified block diagram of a typical instrumentation of said receiver.

Figure 1:
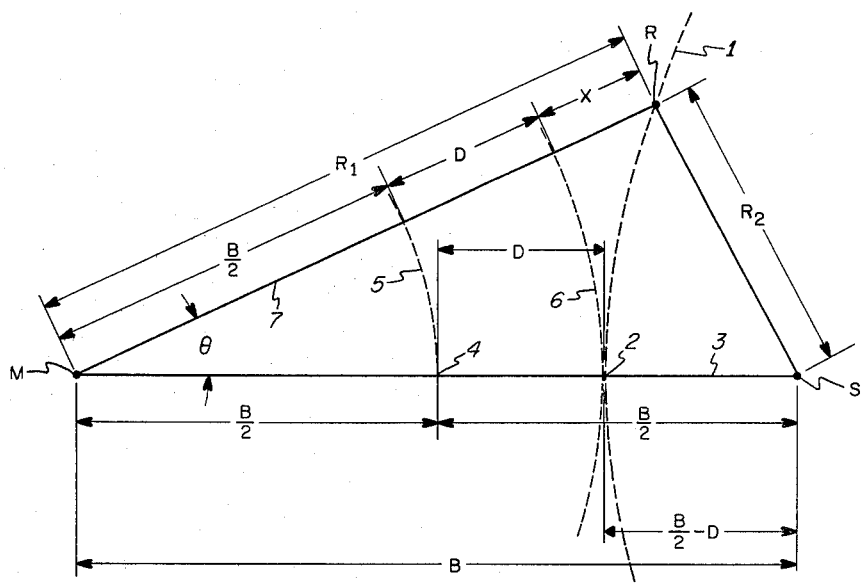
FIG. 1 is a diagram illustrating representative time and space relationships obtaining between the transmitters and the receiver utilized in the present invention.

Referring to FIG. 1, the two transmitting stations M (master) and S (slave) are separated from each other by the distance B (base line). As is well understood in the loran art, both stations emit trains of pulse modulated carrier signals, with the signal emission of the slave station S controlled to occur a predetermined delay (coding delay) after the reception of each master station signal pulse. Said coding delay is a known constant of the system and can be taken into account as a simple matter of calibration. For the sake of simplicity, however, it will be assumed in the following description that the slave coding delay is zero. That is, station S is presumed to emit a pulsed carrier signal simultaneously with the reception of each of the pulses received from station M. The pulses radiated by stations M and S are received by receiver R at times corresponding to the distance separating receiver R from each of the stations M and S. Receiver R is adapted to measure the time difference between the receptions of the pulses from stations M and S and to provide an output indication of said time difference. A typical loran system utilizing a pair of transmitters and a receiver corresponding to stations M and S and receiver R of FIG. 1 is disclosed in U.S. Patent 2,873,445, issued to the present applicant on February 10, 1959, and assigned to the present assignee.

Master station M of FIG. 1 also is outfitted with a receiver similar to receiver R for determining the total elapsed time 2B between the transmission of a given pulsed signal by station M and the reception by station M of the corresponding pulsed signal returned by station S in response to said given signal from station M. The aforementioned elapsed time is attributable to the retardation of the signal transmitted between stations M and S which is a function of the distance separating the stations and the finite velocity of propagation. As will be seen more fully later, a data signal representing one half of the measured elapsed time is transmitted by station M to receiver R. Receiver R also receives the pulsed signals from M and S and determines the time difference between their receptions. Said time difference is designated 2D+B because it is proportional to twice the distance D as shown in FIG. 1 along the base line separating M and S plus an amount equal to the retardation time B experienced by the signals transmitted by station M to station S. This is true in the assumed case of a zero coding delay whereby station S transmits simultaneously with the reception of each pulsed signal from station M.

The time difference factor 2D actually measured in receiver R establishes the position of receiver R as being somewhere on a particular heperbolic contour 1. Neglecting for the moment the time factor B, it should be noted that the same time difference factor 2D will be meausred by receiver R at any location along contour 1 including location 2 along base line 3. Base line 3 is divided for purposes of the following description into two equal portions, each of which is designated by the factor $$\frac{B}{2}$$

in FIG. 1. The distance D, corresponding to the measured time difference 2D, is equal to the separation between the mid-point 4 of base line 3 and point 2 at which contour 1 intersects base line 3.

The distances $$\frac{B}{2}$$

and D have been transferred (along circular arcs 5 and 6 centered at M) from the base line 3 to the line 7 between station M and receiver R. Thus, the total distance separating station M and receiver R may be represented by the scalar summation $$\frac{B}{2}+D+X$$

where X is a function of the position of receiver R along hyperbolic contour 1.

The following relationships obtain in the geometry of FIG. 1;

(1) $\quad |R_1|=\frac{B}{2}+D+X$ (2) $\quad |R_2|=\frac{B}{2}-D+X$ (3) $\quad \vec{R_2}=\vec{B}-\vec{R_1}$ Expressions (1) and (3) are self-evident by inspection of FIG. 1. Expression (2) is derived as follows. The distance between station M and point 2 along base line 3 is equal to $$\frac{B}{2}+D$$

The distance between point 2 and the station S is equal to $$\frac{B}{2}-D$$

Point 2 is on hyperbolic contour 1. Therefore, as the receiver R moves away from base line 3 and along contour 1 to the position shown in FIG. 1, the distance $$\left(\frac{B}{2}+D\right)$$

separating receiver R from station M increases by an amount X. Similarly, the distance $$\left(\frac{B}{2}-D\right)$$

between receiver R and station S also must increase by the identical amount X so that $$|R_2|=\frac{B}{2}-D+X$$

This follows from the fact that a hyperbola such as contour 1 is the locus of points separated from the foci (stations M and S) by distances which differ by a constant amount. In the case of FIG. 1, the difference between the distances separating receiver R and stations M and S may be represented by the expression (4) $\quad |R_1|-|R_2|=2D$ Expression (4) is independent of X. Substituting expression (3) in expression (4) there results (5) $\quad |\vec{R_1}|-|\vec{B}-\vec{R_1}|=|2D|$ The present invention is concerned with the solutions of expressions (1), (3) and (5) in equivalent time units in order to compute the propagational time equivalent of the distance X shown in FIG. 1. The total propagational time delay between receiver R and station M may then be determined merely by summing the time equivalents of the distances $$\frac{B}{2}$$

and D together with the computed propagational time equivalent of the distance X.

Referring now to FIG. 2, stations M and S are designated by the numerals 8 and 9, respectively. Station 8 is shown as being equipped with receiving antenna 10 and transmitting antennas 11 and 12. Station 9 is shown as being equipped with receiving antenna 13 and transmitting antenna 14. The several antennas are shown primarily to emphasize the diverse transmitting and receiving functions performed by each of the stations; the several antennas do not necessarily reflect the actual number required in a given installation. For example, it is possible to time share the same antennas for transmission and reception at each station as is well understood in the art. To simplify the present description, however, it is assumed that antenna 12 radiates a pulse signal which is received by antenna 15 of loran receiver 16 and by antenna 13 of station 9. Station 9, in response to the received pulse, transmits a corresponding pulse signal via antenna 14 to antenna 15 of receiver 16 and to receiving antenna 10 of station 8. Station 8 measures the elapsed time between a given transmission by antenna 12 and the corresponding reception by antenna 10 in the manner well known in the loran art, and transmits a data signal via antenna 11 to antenna 17 of data receiver 18 representing the measured elapsed time.

Loran receiver 16, which may be similar to the one disclosed in FIG. 2 of the aforementioned Patent 2,873,445, measures the time difference between the signals received from antennas 12 and 14 of stations 8 and 9 respectively, and provides an output indication thereof in terms of the angular displacement of rotatable shaft 19. Receiver 16 also produces on output line 20 a series of recurrent pulses synchronized to the pulsed signals received from master station 8. The pulses on line 20 correspond to the pulses d produced at the output of divider chain 16 of Patent 2,873,445 while shaft 19 of FIG. 2 corresponds to the shaft driven by timer 51 of said patent.

The pulses of line 20 are jointly applied to oscillator 21 and to the set terminal of flip-flop 22. Oscillator 21 operates at a convenient high frequency commensurate with the timing precision required of the synchronized timing pulses produced on output line 23. The phase of the oscillations produced by oscillator 21 is maintained in a fixed relationship with pulses of line 20 by the synchronizing action resulting from the application of said pulses to oscillator 21. The signal produced by oscillator 21 is applied to pulse generator 24 to generate a phase locked series of time marking or clock pulses. The clock pulses pass through gate 25, when conductive, and are counted in pulse counter 26. Gate 25 conducts when flip-flop 22 is in the set condition and is closed when flip-flop 22 is in the reset condition. Flip-flop 22 is in the set condition between the occurrence of a given pulse on line 20 and the next following synchronized pulse on line 23; it is in the reset condition between the occurrence of a given synchronized pulse on line 23 and the next following pulse on line 20.

Pulse counter 26 produces output pulses on line 23 at times determined by the numerical capacity of counter 26, the frequency of the clock pulses produced by generator 24, and the value of the number to which counter 26 is preset each time that data gates 27 are rendered conductive by application of a synchronized pulse of line 23 via delay 28. The purpose of delay 28 is to insure that gate 25 is closed before counter 26 is preset. As will be seen more fully later, the value of the number inserted into counter 26 upon each actuation of gates 27 represents the quantity $$\frac{B}{2}+D+X$$

discussed in connection to FIG. 1.

Figure 3:
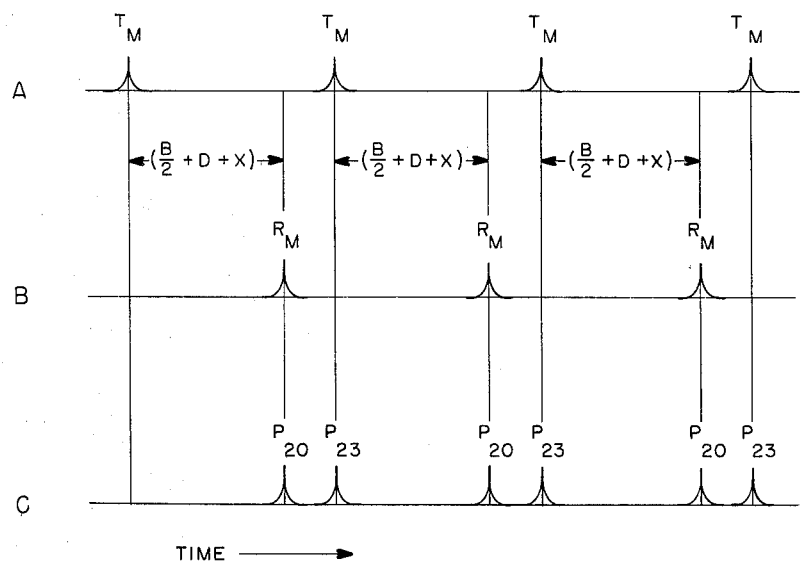
FIG. 3 is a time plot of idealized pulse waveforms pertinent to an understanding of the manner in which said receiver is synchronized to a predetermined one of said transmitters.

An understanding of the function of pulse counter 26 will be facilitated by reference to the idealized pulse waveforms of FIG. 3. Waveform A of FIG. 3 represents a repetitive train of pulsed carrier signals $T_M$ as they are produced at the master transmitting station. As a consequence of the finite velocity of propagation over the distance separating station M and receiver, each of the pulses $T_M$ is retarded or delayed by an amount represented by the sum of the time quantities $$\frac{B}{2}+D+X$$

It should be observed that the time quantity $$\frac{B}{2}$$

is a function of the actual velocity of propagation over the path between stations M and S inasmuch as said quantity is determined by measuring the actual round trip propagational delay between stations M and S. Said delay between station M and receiver R is substantially identical to and varies directly with changes in the propagational delay along the path between stations M and R. Waveform B of FIG. 3 represents the pulses $R_M$ received at receiver R from station M which pulses are delayed by the amount $$\frac{B}{2}+D+X$$

from the corresponding pulse $T_M$ at the master transmitting station. The pulses $P_{20}$ produced on line 20 at the output of receiver 16 occur simultaneously with the received pulses $R_M$.

As previously mentioned, pulses $P_{20}$ open gate 25 permitting the clock pulses of generator 24 to reach counter 26. By the proper selection of the frequency of the clock pulse and the numerical capacity of counter 26, counter 26 may be caused to overflow at a rate identical to the known repetition rate of the transmitted and received pulses $T_M$ and $R_M$. Assuming that counter 26 is reset to zero simultaneously with the occurrence of each pulse $P_{20}$ on line 20, a series of pulses would be produced on line 23 in phase alignment with the received pulse $R_M$. If, however, counter 26 were preset to a number of clock pulses representing the time interval $$\frac{B}{2}+D+X$$

synchronously with each occurrence of the pulses $P_{20}$ of line 20, the timing pulses $P_{23}$ of line 23 would occur in the receiver simultaneously with the occurrence of the transmitted pulses $T_M$ at the transmitter. Such action is achieved by the computing apparatus 65 to be described in connection with FIG. 2.

Loran receiver 16, as previously mentioned, measures the time difference between the receptions of the pulses received from stations M and S and produces an output shaft (19) indication of said time difference. The measured time difference is designated $2D+B$. Shaft 19 is connected to a first input of mechanical differential 37 and is drivably coupled via reduction gearing 29 to a conventional shaft-to-digital converter 30. Gearing 29 effectively divides the input time difference $2D+B$ by a factor of 2 whereby the shaft of converter 30 is driven at half the angular displacement of shaft 19. Converter 30 may be any of the well known converter devices to produce on line 31 a digital signal representation $$D+\frac{B}{2}$$

of half of the time difference indication $2D+B$ represented by the angular displacement of shaft 19. The digital signal representation $$D+\frac{B}{2}$$

is applied to a first input of adding register 32.

Master station 8 also determines the round trip propagational delay $2B$ of a given pulse transmitted by station 8 and returned by station 9 to station 8. A digitally coded signal representing one half of said round trip delay (B) is transmitted by antenna 11 and received by antenna 17 associated with receiver 18. The delay coded signal is detected by digital data receiver 18 and is applied to the electrical signal input of digital-to-shaft converter 33. Converter 33 operates in a conventional manner to convert the electrical digital signal representation to an equivalent mechanical signal represented by the position of output shaft 34. Shaft 34 drives the slider of potentiometer 35 and a second input to differential 37.

Potentiometer 35 is energized by an alternating reference signal produced on line 38 by A.C. generator 36. The output signal produced by generator 36 is designated $K\angle 0°$. The signal on line 38 also energizes potentiometers 39 and 40. The wiper of potentiometer 39 is driven by the output shaft of mechanical differential 37 representing the parameter $2D$ whereby potentiometer 39 produces an electrical signal on output line 41 having an amplitude representing the product $K2D\angle 0°$. The product signal is operated upon by attenuator 42 to provide a signal on line 43 having an amplitude representing $KD\angle 0°$. Attenuator 42 may be simply a center tapped linear resistance providing at the center tap a voltage representing half the input excitation voltage.

Potentiometer 40 is driven by shaft 44 representing the parameter X of FIG. 1 to produce on line 45 an electrical signal designated $KX\angle 0°$. Potentiometer 35, which receives the shaft 34 signal representing B and the electrical signal representing $K\angle 0°$, produces an electrical signal on line 46 representing the product $KB\angle 0°$. The product signal amplitude is divided in half by attenuator 47 to produce on line 48 a signal representing $$K\frac{B}{2}\angle 0°$$

It should be noted that the product signals on lines 43, 45 and 48 are on at the same frequency and are in phase in respect to each other. Said signals are vectorially summed in linear summation network 49 to provide a signal on output line 50 representing the vector sum $$\overrightarrow{KD}+\overrightarrow{KX}+\overrightarrow{\frac{KB}{2}}=\overrightarrow{KR_1} \text{ or } D+X+\frac{B}{2}=R_1$$

The electrical signal on line 46 representing $KB\angle 0°$ is phase shifted in conventional phase shifter 51 by an amount determined by the setting of control knob 52 to produce a signal on line 53 designated $KB\angle\theta$. Knob 52 is set in accordance with the angle $\theta$ shown in FIG. 1 between the base line 3 and the direction (line MR) of receiver R relative to station M. Angle $\theta$ may be measured by conventional direction finder means acting upon the signal received from station M. The phase shifted signal is differentially combined in circuit 54 with the signal on line 50 designated $KR_1\angle 0$, to provide on line 55 a signal representing the vector difference $$\overrightarrow{KB}-\overrightarrow{KR_1}=\overrightarrow{KR_2}$$

The alternating signals on lines 41, 50 and 55 are rectified in rectifiers 56, 57 and 58, respectively, to provide the indicated output signal designated $$|\overrightarrow{K2D}|, |\overrightarrow{KR_1}| \text{ and } |\overrightarrow{KB-KR_1}|$$

It should be noted that only the amplitudes of the signals on the lines 41, 50 and 55 appear at the output of rectifiers 56, 57 and 58. That is, if the signals on lines 41, 50 and 55 are considered to be vector quantities, then the output signals of rectifiers 56, 57 and 58 are the scalar amplitudes thereof. The scalar amplitude signals, in turn, are combined in accordance with the expression $$\epsilon = R_1 - |\overrightarrow{B} - \overrightarrow{R_1}| - 2D$$

When $\epsilon = 0$ the expression reduces to $$R_1 - |\overrightarrow{B} - \overrightarrow{R_1}| = 2D$$

developed in connection with FIG. 1. Thus, the signal $\epsilon$ actually is an error signal which may be used to excite servo 59 to position shaft 44 in accordance with that value of the parameter X in the quantity $KX \angle 0°$ represented by the signal on line 45 which causes the net error signal at the output of rectifiers 56, 57 and 58 to reduce to zero thereby completely solving the triangle of FIG. 1 having the vertices designated M, S and R. Shaft-to-digital converter 60, driven by shaft 44 produces an output digital signal on line 61 representing the parameter X. The digital signal is applied to a second input of adding register 32.

Register 32 sums the two input digital signals representing the parameters $$D + \frac{B}{2}$$

and X, respectively, and produces an output digital representation of the sum on parallel lines 62. Said digital sum representation of signals is applied to counter 26 each time that gates 27 are rendered conductive by the occurrence of a reset pulse at the output of delay 28. In this manner, there is effectively inserted into counter 26 a number equal to the time equivalent of the sum of $$\frac{B}{2} + D - X$$

slightly after the occurrence of each synchronized timing pulse on line 23. Gate 25 is opened simultaneously with the occurrence of each pulse on line 20 whereby the number stored in counter 26 immediately increases at the clock pulse rate (output pulse rate of generator 24) from the preset number until an overflow or output pulse is produced by counter 26 whereupon the cycle repeats.

As can be seen by reference to FIG. 3, each overflow or output pulse $P_{23}$ (produced by counter 26) occurs at the receiver R simultaneously with the occurrence at the master station M of each pulse designated $T_M$. It will be appreciated that if each of a plurality of spacially separated receivers are instrumented in accordance with FIG. 2, all will produce synchronized timing pulses similar to pulses $P_{23}$ simultaneously with the pulses $T_M$ at the master station. All of the separated stations would be synchronized with respect to each other and with respect to the master station independently of the velocity of propagation of the timing $T_M$ generated by the master station and irrespective of any variation that might occur in said velocity of propagation.

It should be noted that although the invention has been described in connection with a loran type position determining system, it is applicable also for use with the transmitting and receiving apparatus of any other type of hyperbolic navigational system.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A receiver for producing a locally generated series of pulsed signals simultaneously with the occurrence at a first distant transmitter of a first series of pulsed signals, said receiver receiving said first signals, a second series of pulsed signals from a second distant transmitter synchronized to said first transmitter, and a third signal representing the propagational delay between said transmitters, said receiver comprising means for producing a fourth signal representing the time difference between the receptions of said first and second signals, a computer adapted to receive said third and fourth signals and a fifth signal representing the bearing of said receiver relative to the base line between said transmitters for computing the propagational delay between said first transmitter and said receiver and producing a sixth signal proportional thereto, a source of said locally generated pulsed signals, and means connected to said source and adapted to receive said sixth signal for controlling the timing of said locally generated pulsed signals in accordance with said sixth signal.

2. A receiver for producing a locally generated series of pulsed signals synchronously with the occurrences at a first distant transmitter of a first series of recurrent pulsed signals, said receiver receiving said first signal, a second series of recurrent pulsed signals from a second distant transmitter synchronized to said first transmitter, and a third signal representing the propagational delay between said transmitters, said receiver comprising means for producing a fourth signal representing the time difference between the receptions of said first and second signals, a computer adapted to receive said third and fourth signals and a fifth signal representing the bearing of said receiver relative to the base line between said transmitters for computing the propagational delay between said first transmitter and said receiver and producing a sixth signal related thereto, a source of recurrent pulses, a pulse counter connected to receive said recurrent pulses, said counter producing said locally generated series of pulsed signals, and means for presetting the value of the count in said counter in accordance with said sixth signal each time that one of said first signal is received.

3. A receiver for producing a locally generated series of pulsed signals simultaneously with the occurrences at a first distant transmitter of a first series of recurrent pulsed signals, said receiver receiving said first signals, a second series of recurrent pulsed signals from a second distant transmitter synchronized to said first transmitter, and a third signal representing the propagational delay between said transmitters, said receiver comprising.

means for producing a fourth signal representing the time difference between the receptions of said first and second signals, a computer adapted to receive said third and fourth signals and a fifth signal representing the bearing of said receiver relative to the base line between said transmitters for computing the propagational delay between said first transmitter and said receiver and producing a sixth signal representing the value thereof, a source of recurrent pulses, a pulse counter connected to receive said recurrent pulses, said counter producing said locally generated series of pulsed signals, and means for presetting the count in said counter to a value equivalent to the value represented by said sixth signal each time that one of said first signals is received.

9

4. A timing signal synchronizing system comprising first and second transmitting stations transmitting synchronized first and second series of pulsed signals, respectively, means located at said first station for determining the propagational delay between said stations and transmitting a third signal representing said propagational delay,
a receiver for receiving said first, second and third signals and producing a fourth signal representing the time difference between the receptions of said first and second signals,
a computer connected to receive said third and fourth signals and a fifth signal representing the bearing of said receiver relative to the base line between said first and second stations and computing the propagational delay between said first station and said receiver and producing a sixth signal proportional thereto,
a source of locally generated pulsed signals,
and means connected to said source and adapted to receive said sixth signal for controlling the timing of said locally generated pulsed signals in accordance with said sixth signal.

5. A timing signal synchronizing system comprising first and second transmitting stations transmitting synchronizied first and second series of recurrent pulsed signals, respectively, means located at said first station for determining the propagational delay between said stations and transmitting a third signal representing said propagational delay,
a receiver for receiving said first, second and third signals and producing a fourth signal representing the time difference between the receptions of first and second signals,
a computer connected to receive said third and fourth signals and a fifth signal representing the bearing of said receiver relative to the base line between said stations and computing the propagational delay between said first station and receiver and producing a sixth signal related thereto,

10 a source of recurrent pulses,
a pulse counter connected to receive said recurrent pulses,
and means for presetting the value of the count in said counter in accordance with said sixth signal each time that one of said first signals is received.

6. A timing signal synchronizing system comprising first and second transmitting stations transmitting synchronized first and second series of recurrent pulsed signals, respectively, means located at said first station for determining the propagational delay between said stations and transmitting a third signal representing said propagational delay,
a receiver for receiving said first, second and third signals and producing a fourth signal representing the time difference between the receptions of first and second signals,
a computer connected to receive said third and fourth signals and a fifth signal representing the bearing of said receiver relative to the base line between said first and second stations for computing the propagational delay between said first station and said receiver and producing a sixth signal representing the value thereof,
a source of recurrent pulses,
a pulse counter connected to receive said recurrent pulses,
and means for presetting the count in said counter to a value equivalent to the value represented by said sixth signal each time that one of said first signals is received.

References Cited by the Examiner

UNITED STATES PATENTS 2,523,244  9/50  Woodward _____ 343—103
3,051,948  8/62  De Faymoreau et al. ___ 343—103

CHESTER L. JUSTUS, *Primary Examiner.*

MALCOLM A. MORRISON, *Examiner.*